United States Patent Office 3,801,541
Patented Apr. 2, 1974

3,801,541
THERMAL STABILIZATION OF ACRYLIC POLYMERS
George Henry Hofmann, Parkersburg, W. Va., assignor to E. I. du Pont de Nemours and Company, Wilmington, Del.
No Drawing. Continuation-in-part of abandoned application Ser. No. 147,631, May 27, 1971. This application Feb. 7, 1973, Ser. No. 330,388
Int. Cl. C08f 45/58
U.S. Cl. 260—45.85 H
14 Claims

ABSTRACT OF THE DISCLOSURE

Improved thermal stability of methyl methacrylate homopolymers and methyl methacrylate copolymers is achieved by adding to the polymer a small amount of pentaerythritol tetrakis (thioglycolate), trimethylol propane tris(thioglycolate) or trimethylol ethane tris(thioglycolate).

REFERENCE TO PRIOR APPLICATION

This application is a continuation-in-part of U.S. application Ser. No. 147,631, filed May 27, 1971, now abandoned.

SUMMARY OF THE INVENTION

This invention relates to a process for thermally stabilizing methyl methacrylate polymers and the products produced therefrom. More specifically, it refers to an improved process for stabilizing methyl methacrylate-containing polymers by adding a particular thermal stabilizer to methyl methacrylate containing polymer prior to its extrusion and final packaging.

BACKGROUND OF THE INVENTION

It is known in the art that various mercapto compounds can stabilize polyolefins and halogen containing resins. See U.S. Pat. 3,144,422. It is also known from U.S. Pat. 3,364,182 that methyl methacrylate monomer can be polymerized in the presence of small amounts of a mercapto compound. It is also generally known in the art that mercapto compounds retard radical chain degradation in many types of polymers. However, even with this knowledge, there still remains a problem in finding among the many thousands of mercapto compounds, the ones that most efficiently reduce the degradation of methyl methacrylate polymers. The generation of small amounts of volatiles caused by polymer degradation during molding and extrusion results in fabricated articles that are defective and unusable. The reduced yield of acceptable articles naturally results in higher costs. In order to reduce costs, it is important to reduce as much as possible the thermal degradation of these methyl methacrylate-containing polymers.

DETAILED DESCRIPTION OF THE INVENTION

I have found that with the addition of small amounts of one or more of three particular mercapto compounds one can obtain a surprising improvement over the prior art methods for stabilizing many of the methyl methacrylate-containing polymers. Three compounds having outstanding thermal stabilizing effect on methyl methacrylate polymers are pentaerythritol tetrakis (thioglycolate) also known as pentaerythritol tetrakis (mercaptoacetate) and hereinafter described as "PETT," trimethylol propane tris(thioglycolate) also known as 1,1,1-trimethylolpropane tri(mercaptoacetate) hereinafter referred to as "TPTT" and trimethylol ethane tris(thioglycolate) also known as 1,1,1 - trimethylolethane tri(mercaptoacetate) hereinafter referred to as "TETT."

I have found that such a compound improves the thermal stability of homopolymers of methyl methacrylate or copolymers obtained from the polymerization of methyl methacrylate monomer with one or two other monomers of the formula:

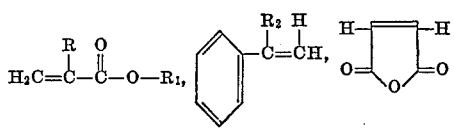

or

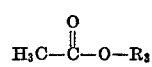

wherein

R is H or $CH_3$;
$R_1$ is H, alkyl of 1 through 4 carbon atoms, cyclohexyl, alkene of 2 through 3 carbon atoms or $$-CH_2-CH-CH_2$$
$$\phantom{-CH_2-}\underset{O}{\diagdown\diagup}$$

provided, however, that R and $R_1$ are not each $CH_3$ concurrently;
$R_2$ is H, $CH_3$ or $CH_2OH$; and
$R_3$ is alkene of 2 or 3 carbon atoms.

These other monomers are also known by name as methyl acrylate, ethyl acrylate, propyl acrylate, butyl acrylate, cyclohexyl acrylate, cyclohexyl methacrylate, phenyl allyl alcohol, glycidyl methacrylate, styrene, α-methyl styrene, methacrylic acid, maleic anhydride, allyl acrylate, vinyl acrylate, allyl acetate, vinyl acetate and ethyl methacrylate.

The total amount of other (non-methyl methacrylate) monomer units in the copolymer can be 0.2 to 50 percent by weight. It is also possible to have less non-methyl methacrylate monomer units, but in these instances the polymer would be substantially indistinguishable from homopolymer of methyl methacrylate.

The amount of PETT, TPTT or TETT required to be added to the polymer to achieve improved thermal stability is in the range from about 0.01 to 5 percent by weight of the polymer. It is preferred to use from about 0.05 to 1 percent by weight thermal stabilizer for best results and it is particularly preferred to use about 0.1 percent by weight for overall best advantage.

It is important in order to achieve the outstanding thermal stabilizing effect that the PETT, TPTT or TETT be added to the methyl methacrylate-containing polymer after polymerization is complete. This is done prior to or during the extrusion of the polymer to form the cube or cylindrical shaped materials that are normally sold commercially to polymer processors for molding and extrusion. The methyl methacrylate polymer granules made by a dispersion process are suitable for this stabilizing treatment. They vary in size usually from about 20 to 500 microns. Alternatively, the methyl methacrylate polymers can be molten or in the form of spheres, cubes, irregular particles, cylinders or in any other form suitable for feeding to an extruding machine. These granules are extruded by well-known techniques at temperatures usually in the range of 200° C. to 310° C. The extruded product is then normally chopped to a size of about ⅛ of an inch on each edge. However, depending on extrusion technique the final product can be of any shape and can be larger or even smaller depending upon the desires of the manufacturer.

The PETT, TPTT or TETT can be added to the granules in the amount indicated above and then the mixture can be stored for later extrusion. Alternatively, the PETT, TPTT or TETT can be added directly in the amounts set forth above to a continuous feed of polymer immediately prior to the introduction of the polymer into the extruding device or directly to the molten polymer in the extruding device.

One of the outstanding advantages of the use of PETT, TPTT or TETT in the present invention is the ability for a molder to use higher melt temperatures and longer hold-up times in his molding process without fear of degradation resulting in splay. Splay is a white frosting effect from foam smeared on a molded article. The volatile generated foam results from polymer degradation. The higher melt temperatures enable the fabricator to process his moldings at a more rapid rate and thus under more economic conditions.

The following additional examples and comparisons with the prior art are provided to set forth the invention in still greater detail. In these examples all percents (%) are by weight unless otherwise indicated.

EXAMPLE 1

A granular methyl methacrylate/ethyl acrylate copolymer containing 4.5 percent by weight ethyl acrylate and made by a granulation or dispersion process such as described in British Pat. 894,429 is mixed with 0.5 percent by weight of PETT. The copolymer used (about 100 grams) is thoroughly blended with the PETT for about three minutes in a high speed Waring Blender.

The same procedure is followed but there is substituted a like amount by weight of TPTT for the PETT.

The same procedure is followed but there is substituted a like amount by weight of TETT for the PETT.

A separate untreated sample of the methyl methacrylate/ethyl acrylate copolymer is set aside as a control.

Portions (3 grams each) of the four samples are then separately heated in a nitrogen atmosphere at 300° C. for thirty minutes. The weight loss measured after this treatment and for each sample is given in the following table.

|  | Percent | | |
|---|---|---|---|
| Stabilizer | Thermal stabilizer | 300° C. wt. loss | Improvement over control |
| Pentaerythritol tetrakis (thioglycolate) (PETT) | 0.5 | 1.8 | 46 |
| Trimethylol propane tris (thioglycolate) (TPTT) | 0.5 | 2.0 | 39 |
| Trimethylol ethane tris (thioglycolate) (TETT) | 0.5 | 1.9 | 42 |
| Control (none) |  | 3.3 |  |

A comparison in the same test with other mercapto compounds shows that these high percent improvements cannot be obtained with all mercapto compounds. See the following.

|  | Percent | |
|---|---|---|
| Compounds | Wt. loss | Improvement |
| Pentaerythritol tetrakis (3-mercaptopropionate) | 2.5 | 24 |
| d-Limonene dimercaptan | 2.5 | 24 |
| Ethylene glycol bis(thioglycolate) | 2.6 | 21 |
| Ethylene glycol bis(3-mercaptopropionate) | 2.7 | 18 |
| 2-mercaptobenzo thiazole | 2.8 | 15 |
| Trimethylol propane tris(3-mercaptopropionate) | 2.9 | 12 |
| Tris(lauryl-2-thioethyl)-phosphite | 2.9 | 12 |
| Distearyl thiodipropionate | 3.0 | 9 |
| Dilauryl-3,3-thiodipropionate | 3.1 | 6 |
| 4-(methylthio)-M-cresol | 3.9 | −18 |
| 4-(methylthio) phenol | 4.1 | −24 |

EXAMPLE 2

Using the same kind of granular copolymer but from a different batch and the same procedure used in Example 1, substituting only different amounts by weight of PETT for the 0.5 percent by weight PETT used in Example 1, the following results are obtained.

|  | Percent | |
|---|---|---|
|  | 300° C. wt. loss | Improvement over control |
| PETT added, percent: |  |  |
| None (control) | 2.9 |  |
| 0.25 | 1.6 | 45 |
| 0.12 | 2.0 | 31 |
| 0.06 | 2.2 | 24 |

EXAMPLE 3

A copolymer of methyl methacrylate/ethyl acrylate is prepared in the manner of Example 1 of U.S. Pat. 3,364,182 but varying percents of PETT are added *before* the polymerization process is completed. The copolymer in each instance contains about 4.5 percent by weight of ethyl acrylate. Like quantities of the same copolymer are prepared but without adding PETT before polymerization is complete. Rather the PETT is added *after* polymerization is complete as evidenced by the formation of the solid polymer granules. The individual products are tested in the 300° C. weight loss test described in Example 1. The following results are obtained.

|  | Percent | |
|---|---|---|
|  | 300° C. wt. loss | Improvement over control |
| Addition of PETT before polymerization, percent: |  |  |
| 0 | 3.3 |  |
| 0.20 | 3.2 | 3 |
| 0.30 | 3.1 | 6 |
| 0.35 | 3.0 | 9 |
| Addition of PETT after polymerization, percent: |  |  |
| 0 | 2.9 |  |
| 0.06 | 2.2 | 24 |
| 0.12 | 2.0 | 31 |
| 0.25 | 1.6 | 45 |

EXAMPLE 4

A granular methyl methacrylate/ethyl acrylate copolymer containing 0.25 percent by weight ethyl acrylate and made by a granulation or dispersion process such as described in British Pat. 894,429 is mixed in separate equal batches with 0.5% by weight of the four additives shown below. In each instance, the copolymer is thoroughly blended with a additive for about three minutes in a high speed Waring Blender.

One equal amount of copolymer is set aside as a control and does not contain one of the additives.

Each of the five samples are separately heated in a nitrogen atmosphere at 300° C. for thirty minutes. The weight loss determination is made on each mixture and the results are shown in the following tabe. The significant advantage of using PETT as the additive is self-evident.

|  | Percent | |
|---|---|---|
| Additive | 300° C. wt. loss | Improvement over control |
| None (control) | 5.6 |  |
| Pentaerythritol tetrakis (thioglycolate) (PETT) | 2.9 | 59 |
| Thioglycerol | 3.9 | 30 |
| Dodecyl benzyl mercaptan | 4.2 | 25 |
| Pentaerythritol tetrakis (3-mercaptopropionate) | 4.9 | 12 |

EXAMPLE 5

An experiment is carried out in the manner of Example 4 except that methyl methacrylate granular homopolymer is used in place of the methyl methacrylate/ethyl acrylate copolymer. The homopolymer is prepared using a granulation or dispersion process such as described in British Pat. 894,429. In the manner of Example 4, a control and four separate batches employing 0.5% by weight different additives are prepared and given the 300° C. weight loss test. The significant advantage using PETT as the additive is self-evident in the test results shown below.

| Additive | 300° C. wt. loss | Percent Improvement over control |
|---|---|---|
| None (control) | 7.2 | |
| Pentaerythritol tetrakis (thioglycolate) (PETT) | 5.0 | 31 |
| Pentaerythritol tetrakis (3-mercaptopropionate) | 5.9 | 18 |
| Dodecyl benzyl mercaptan | 6.3 | 12 |
| Thioglycerol | 6.4 | 11 |

EXAMPLE 6

A granular methyl acrylate/methyl methacrylate copolymer containing 0.25 percent by weight methyl acrylate is prepared in the laboratory by a granulation or dispersion process such as described in British Pat. 894,429. This copolymer is mixed with 0.5% by weight of PETT. The copolymer used (about 50 grams) is thoroughly blended with the PETT for about three minutes in a high speed Waring Blender.

The copolymer mixed with PETT is then passed through a melt indexer at about 260° C. in order to melt the polymer and enhance the blending efficiency.

A separate sample of the same copolymer, but without added PETT, is treated in the same manner to serve as a control. The weight loss of the two samples is also determined by the process of Example 1. A comparison between the two samples is set forth below.

| Stabilizer | 300° C. wt. loss | Percent Improvement over control |
|---|---|---|
| Control (none) | 8.1 | |
| PETT | 5.1 | 37 |

EXAMPLE 7

An experiment is carried out in the like manner as Example 6 except that the copolymer contains one percent by weight of methyl acrylate instead of 0.25 percent by weight. A comparison between the two samples is set forth below.

| Stabilizer | 300° C. wt. loss | Percent Improvement over control |
|---|---|---|
| Control (none) | 7.6 | |
| PETT | 4.3 | 43 |

EXAMPLE 8

An experiment is carried out in like manner as Example 6 except that the copolymer contains two percent by weight of methyl acrylate instead of 0.25 percent by weight. A comparison between the two samples is set forth below.

| Stabilizer | 300° C. wt. loss | Percent Improvement over control |
|---|---|---|
| Control (none) | 7.0 | |
| PETT | 3.9 | 44 |

EXAMPLE 9

A granular methyl acrylate/methyl methacrylate copolymer containing 0.25 percent by weight methyl acrylate is prepared in a semi-works by a granulation or dispersion process such as described in British Pat. 894,429. Five separate lots are prepared in the same manner.

A sample from each lot is thoroughly mixed with 0.5 percent by weight of PETT. Each sample including untreated controls are then passed through a melt indexer at about 260° C. The weight loss of all the samples is then determined by the test procedure described in Example 1. The results are set forth below.

| Lot | PETT | 300° C. wt. loss | Percent Improvement over control |
|---|---|---|---|
| 1 (control) | 0 | 5.0 | |
| 1 | 0.5 | 4.0 | 20 |
| 2 (control) | 0 | 4.6 | |
| 2 | 0.5 | 3.0 | 35 |
| 3 (control) | 0 | 3.3 | |
| 3 | 0.5 | 2.4 | 27 |
| 4 (control) | 0 | 3.5 | |
| 4 | 0.5 | 2.3 | 34 |
| 5 (control) | 0 | 3.1 | |
| 5 | 0.5 | 2.4 | 23 |

EXAMPLE 10

A granular methyl methacrylate/phenyl allyl alcohol copolymer containing 1 percent by weight phenyl allyl alcohol is prepared by a granulation or dispersion process such as described in British Pat. 894,429. PETT is added at a controlled rate to an extruder at the same time the granular polymer is being added to the extruder. The extruded copolymer containing about 0.05% PETT is then compared with a like quantity of the same extruded copolymer but not mixed with PETT in a test of the same kind as described in Example 1. The test results are set forth in the following table.

| Stabilizer | 300° C. wt. loss | Percent Improvement over control |
|---|---|---|
| Control (none) | 3.2 | |
| PETT | 2.0 | 38 |

EXAMPLE 11

A granular copolymer of the same kind as described in Example 1 is fed to an extruder at the same time as PETT is added at a controlled rate. Varying rates of PETT are used so that several products are formed containing different percents by weight of PETT as shown below. The data obtained are as follows after evaluating the products.

| Stabilizer | Percent | 300° C. wt. loss, percent | Maximum molding holdup time prior to degradation at 290° C. molding temp. |
|---|---|---|---|
| Control | None | 2.4 | 8 minutes. |
| PETT | 0.05 | 2.0 | 15 minutes. |
| PETT | 0.13 | 1.9 | 18 minutes. |
| PETT | 0.23 | 1.7 | 21 minutes. |

EXAMPLE 12

A quantity of PETT (0.07 percent by weight) is co-extruded at 250° C. with a batch of methyl methacrylate/ethyl acrylate (95.5 percent by weight/4.5 percent by weight) copolymer. The 300° C. weight loss is reduced from 2.7% to 1.5% representing a 45% improvement. This stabilized extruded polymer can be molded at high temperatures (290° C.) and long hold-up times (20 minutes). Unstabilized polymer degrades at hold-up times of less than 10 minutes when molded at this temperature.

EXAMPLE 13

Co-extrusion at 250° C. of PETT (0.16 percent by weight) with methyl methacrylate/ethyl acrylate (99.75 percent by weight/0.25 percent by weight) copolymer reduces the 300° C. weight loss from 6.6% to 3.6% representing a 45% improvement.

EXAMPLE 14

Co-extrusion at 250° C. of PETT (0.29 percent by weight) with methyl methacrylate homopolymer reduces the 300° C. weight loss from 6.6% to 3.6% representing 37% improvement.

EXAMPLE 15

A granular ethyl acrylate/methacrylate copolymer containing 4.5 percent by weight ethyl acrylate is prepared in the laboratory by a granulation or dispersion process such as described in British Pat. 894,429. This copolymer is mixed in one batch with 0.01 percent by weight of PETT and in a second batch with 0.03 percent by weight of PETT. The copolymer used (about 50 grams in each sample) is thoroughly blended with the PETT for about three minutes in a high speed Waring Blender.

The two copolymer mixtures with PETT are then passed separately through a melt indexer at about 230° C. in order to melt the polymer and enhance the blending efficiency.

A separate sample of the same copolymer, but without added PETT, is treated in the same manner to serve as a control. The weight loss of the three samples is also determined by the process of Examle 1. A comparison between the three samples is set forth below.

| Amount of PETT stabilizer | 300° C. wt. loss | Percent Improvement over control |
|---|---|---|
| Control (none) | 2.9 | |
| 0.01 | 2.8 | 3.5 |
| 0.03 | 2.5 | 14 |

EXAMPLE 16

A granular α-methyl styrene/methyl methacrylate copolymer containing 15 percent by weight α-methyl styrene is prepared in the laboratory by a granulation or dispersion process such as described in British Pat. 894,429. This copolymer is mixed with 0.5 percent by weight of PETT. The copolymer used (about 50 grams) is thoroughly blended with the PETT for about three minutes in a high speed Waring Blender.

The copolymer mixed with PETT is then passed through a melt indexer at about 260° C. in order to melt the polymer and enhance the blending efficiency.

A separate sample of the same copolymer, but without added PETT, is treated in the same manner to serve as a control. The weight loss of the two samples is also determined by the process of Example 1. A comparison between the two samples is set forth below.

| PETT, percent | 300° C. wt. loss | Percent Improvement over control |
|---|---|---|
| 0 | 14.8 | |
| 0.5 | 12.0 | 19 |

EXAMPLE 17

A granular methyl methacrylate/ethyl acrylate/styrene copolymer containing 2% by weight ethyl acrylate and 2% by weight styrene is prepared in the laboratory by a granulation or dispersion process such as described in British Pat. 894,429. This copolymer is mixed with 0.5% by weight of PETT. The copolymer used (about 35 grams) is thoroughly blended with the PETT for about three minutes in a high speed Waring Blender. A separate sample of the same copolymer, but without added PETT serves as a control. The weight losses of the two samples are determined by the process of Example 1. A comparison of the two samples is set forth below.

| Amount of PETT stabilizer, percent | 300° C. wt. loss | Percent Improvement over control |
|---|---|---|
| Control (none) | 4.7 | |
| 0.5 | 2.9 | 38 |

EXAMPLE 18

Another copolymer consisting of methyl methacrylate, methyl acrylate (2% by weight) and styrene (2% by weight) is prepared and treated identically to the previous example. The weight losses of the treated and untreated samples are determined by the process of Example 1. A comparison of the two samples is set forth below.

| Amount of PETT stabilizer, percent | 300° C. wt. loss | Percent Improvement over control |
|---|---|---|
| Control (none) | 4.6 | |
| 0.5 | 3.3 | 28 |

EXAMPLE 19

A granular methyl methacrylate/methyl acrylate/ethyl acrylate copolymer containing 2% by weight methyl acrylate and 2% by weight ethyl acrylate is prepared in the laboratory by a granulation or dispersion process such as described in British Pat. 894,429. This copolymer is mixed with 0.5% by weight of PETT. The copolymer used (about 35 grams) is thoroughly blended with the PETT for about three minutes in a high speed Waring Blender. A separate sample of the same copolymer, but without added PETT serves as a control. The weight loss of the two samples is determined by the process of Example 1. A comparison of the two samples is set forth below.

| Amount of PETT stabilizer, percent | 300° C. wt. loss | Percent Improvement over control |
|---|---|---|
| Control (none) | 3.6 | |
| 0.5 | 2.5 | 31 |

The term "copolymer" as used in this specification and claims includes polymers having two or three different polymerized monomer units.

What is claimed is:

1. A methyl methacrylate homopolymer containing 0.01 to 5 percent by weight of a thermal stabilizer selected from the group consisting of pentaerythritol tetrakis (thioglycolate), trimethylol propane tris(thioglycolate), and trimethylol ethane tris(thioglycolate), said stabilizer having been added to said polymer after polymerization.

2. A homopolymer according to claim 1 wherein the homopolymer contains 0.05 to 1 percent by weight of thermal stabilizer.

3. A homopolymer according to claim 2 wherein the stabilizer is pentaerythritol tetrakis (thioglycolate).

4. A homopolymer according to claim 2 wherein the stabilizer is trimethylol propane tris(thioglycolate).

5. A homopolymer according to claim 2 wherein the stabilizer is trimethylol ethane tris(thioglycolate).

6. A copolymer comprising polymerized methyl methacrylate monomer units and one or two other polymerized monomer units selected from the group consisting of compounds of the formulae

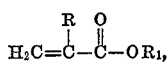 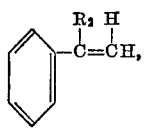 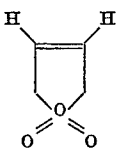

and

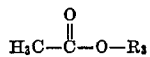

wherein
  R is H or CH₃;
  R₁ is H, alkyl of 1 through 4 carbon atoms, cyclohexyl, alkene of 2 through 3 carbon atoms or

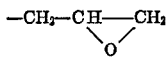

provided, however, that R and R₁ are not each CH₃ concurrently;
wherein
  R is H or CH₃;
  R₃ is alkene of 2 or 3 carbon atoms, the total amount of said other monomer units in said copolymer being up to 50 percent by weight of the polymer; and 0.01 to 5 percent by weight of a thermal stabilizer from the group consisting of pentaerythritol tetrakis (thioglycolate), trimethylol propane tris(thioglycolate) and trimethylol ethane tris(thioglycolate), said stabilizer having been added to said polymer after polymerization.

7. A copolymer according to claim 6 wherein the copolymer contains 0.05 to 1 percent by weight of thermal stabilizer.

8. A methyl methacrylate copolymer according to claim 7 wherein the monomer is ethyl acrylate.

9. A methyl methacrylate copolymer according to claim 8 wherein the thermal stabilizer is trimethylol pro-tetrakis (thioglycolate).

10. A methyl methacrylate copolymer according to claim 8 wherein the thermal stabilizer is trimethylol propane tris(thioglycolate).

11. A methyl methacrylate copolymer according to claim 8 wherein the thermal stabilizer is trimethylol ethane tris(thioglycolate).

12. A methyl methacrylate copolymer according to claim 6 containing polymerized ethyl acrylate units and polymerized styrene units.

13. A methyl methacrylate copolymer according to claim 6 containing polymerized methyl acrylate units and polymerized styrene units.

14. A methyl methacrylate copolymer according to claim 6 containing polymerized ethyl acrylate units and polymerized methyl acrylate units.

References Cited
UNITED STATES PATENTS

| | | | |
|---|---|---|---|
| 3,114,422 | 8/1964 | Homberg | 260—45.85 |
| 3,154,600 | 10/1964 | Munn | 260—86.1 |
| 3,364,182 | 1/1968 | Griffith | 260—79 |

DONALD E. CZAJA, Primary Examiner

V. P. HOKE, Assistant Examiner

U.S. Cl. X.R.

260—45.75, 45.7 PS, 45.8 SN, 45.85 S, 45.95 C

PO-1050
(5/69)

UNITED STATES PATENT OFFICE
CERTIFICATE OF CORRECTION

Patent No. 3,801,541    Dated April 2, 1974

Inventor(s) GEORGE HENRY HOFMANN

It is certified that error appears in the above-identified patent and that said Letters Patent are hereby corrected as shown below:

Column 9, Claim 6, line 25, "wherein" should be deleted.

Column 9, Claim 6, line 26, which reads "R is H or $CH_3$" should be corrected to read as follows:

---$R_2$ is H, $CH_3$ or $CH_2OH$; and---.

Column 10, Claim 9, line 6, "trimethylol pro-" should read as follows:   -- pentaerythritol --

Signed and sealed this 1st day of October 1974.

(SEAL)
Attest:

McCOY M. GIBSON JR.
Attesting Officer

C. MARSHALL DANN
Commissioner of Patents